No. 850,802. PATENTED APR. 16, 1907.
R. M. SPILLMAN.
LOCOMOTIVE HEADLIGHT.
APPLICATION FILED NOV. 26, 1906.

Witnesses
L. B. James
C. W. Griesbauer

Inventor
R. M. Spillman
by H. B. Willson & Co.
Attorneys

UNITED STATES PATENT OFFICE.

RICHARD M. SPILLMAN, OF PRINCETON, INDIANA.

LOCOMOTIVE-HEADLIGHT.

No. 850,802.  Specification of Letters Patent.  Patented April 16, 1907.

Application filed November 26, 1906. Serial No. 345,124.

*To all whom it may concern:*

Be it known that I, RICHARD M. SPILLMAN, a citizen of the United States, residing at Princeton, in the county of Gibson and State of Indiana, have invented certain new and useful Improvements in Locomotive-Headlights; and I do declare the following to be a full, clear, and exact description of the invention, such as will enable others skilled in the art to which it appertains to make and use the same.

My invention relates to locomotive-headlights and means for automatically adjusting the same to cause the lights to illuminate the track when rounding a curve; and it consists in the construction, combination, and arrangement of devices hereinafter described and claimed.

Figure 1:
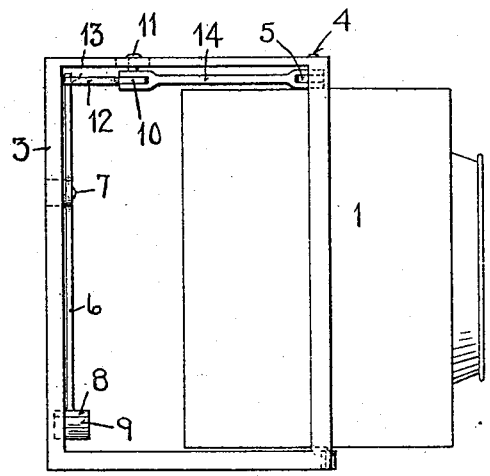
Figure 2:
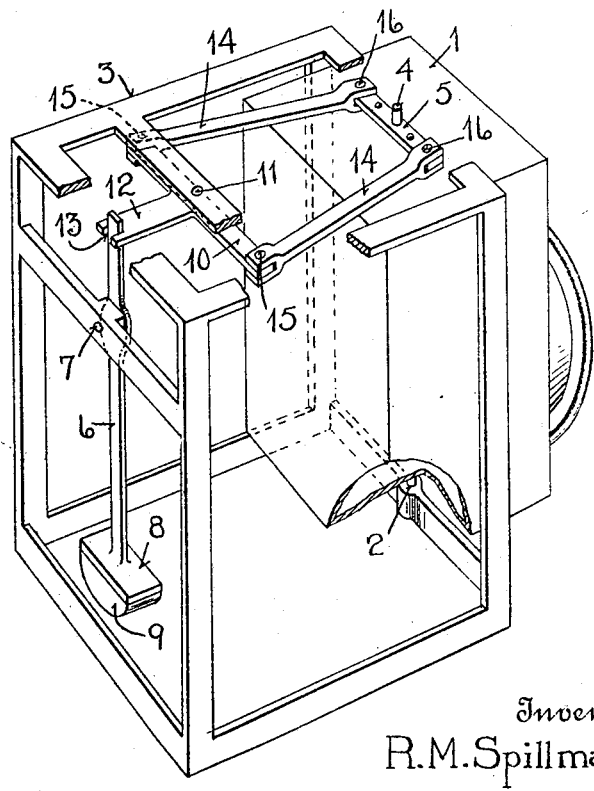

In the accompanying drawings, Figure 1 is a side elevation of a locomotive-headlight-adjusting means embodying my invention, and Fig. 2 is a perspective view of the same with parts broken away.

The headlight 1 may be of the usual or of any preferred construction. The lower end of the headlight is pivotally mounted, as at 2, in a frame 3, which frame may be supported at the front end of the locomotive-boiler by means of supporting-brackets such as are ordinarily employed. The headlight is provided at its upper end with a pivot 4, which is in line with the pivot 2 and has its bearing in the frame 3. A bar 5 is rigidly secured on the upper side of the headlight 1 and turns therewith. In the rear side of the frame 3 is a pendulum-bar 6, which is fulcrumed at 7 and is provided at its lower end with a cross-bar 8, to which is secured a weight 9. A bar 10 is pivotally mounted, as at 11, under the top of the frame 3 and is provided with a rearwardly-extending arm 12, the rear end of which is notched, as at 13, to receive the upper end of the pendulum-bar 6 and provides a loose pivotal connection between said pendulum-bar and the bar 10. The ends of the latter are connected to the ends of the bar 5 by links 14, which are pivotally connected to said bar 10 and bar 5 as at 15 16.

When a locomotive which carries the headlight is traveling on a straight track, the pendulum-bar will remain in a vertical position and will hold the headlight against pivotal movement so as to direct the rays of light from the headlight directly along the track. When the locomotive reaches a curve and becomes slightly tilted by the raised outer rail of the curve, the pendulum-bar in order to keep in a vertical position will describe angular movement with reference to the frame 2, and such angular movement of the pendulum-bar will cause the bar 10 to slightly turn and the headlight to turn therewith in the direction required to illuminate the curve ahead of the locomotive, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

In combination with a supporting-frame, a locomotive-headlight in the front side thereof partially incased thereby and having pivots at its upper and lower ends in bearings in the upper and lower sides of the frame and pivotally mounting said headlight for horizontal angular movement in the front portion of the frame, a pendulum-bar pivotally mounted in the rear side of said frame and having a weight at its lower end, a bar pivotally mounted under the upper side of said frame and having a rearwardly-extending frame connected to the upper end of said pendulum-bar for angular movement with reference thereto, and link-bars, each having its front end pivotally connected to the upper side of the headlight and its rear end pivotally connected to one end of said pivotally-mounted bar.

In testimony whereof I have hereunto set my hand in presence of two subscribing witnesses.

RICHARD M. SPILLMAN.

Witnesses:
JOHN N. CRAIG,
CHAS. O. BALZEN.